INVENTORS
MILES C. JOHNSON AND
WALTER W. WEINSTOCK
BY
*J. L. Whittaker*
ATTORNEY

June 20, 1961  M. C. JOHNSON ET AL  2,989,742
MOVING TARGET INDICATION RADAR SYSTEMS
Filed July 18, 1956  6 Sheets-Sheet 6

INVENTORS
MILES C. JOHNSON AND
WALTER W. WEINSTOCK
BY
ATTORNEY

United States Patent Office 2,989,742
Patented June 20, 1961

2,989,742
MOVING TARGET INDICATION RADAR SYSTEMS
Miles C. Johnson, Mount Holly, N.J., and Walter W. Weinstock, Philadelphia, Pa., assignors to Radio Corporation of America, a corporation of Delaware
Filed July 18, 1956, Ser. No. 598,592
17 Claims. (Cl. 343—7.7)

The present invention relates generally to moving target indication (MTI) radar systems and particularly to new and improved means in such systems for reducing and suppressing the effects of clutter fluctuation.

In coherent "line-by-line" MTI radar systems, the echoes received during one pulse repetition interval are compared in phase or amplitude with corresponding echoes received during the following pulse repetition interval and, when they are different, an output signal is obtained. Generally speaking, the echoes from moving targets change in amplitude and phase from pulse-to-pulse and produce an output signal, but those from fixed targets do not and produce no resulting signal. A coherent line-by line MTI system is coherent in the sense that the system generates a signal having a reference phase as a phase locking signal for the transmitted pulses and as a reference signal for the received echoes.

In certain applications, line-by-line MTI has serious limitations. One such application is the landing of aircraft by ground controlled approach (GCA) radar. During the final approach of the aircraft, the GCA precision antennas must scan at a relatively high rate in order closely to follow the aircraft. The high scanning rate requires a relatively high pulse repetition rate to give the required number of hits per beam width for reliable detection. The pulse carrier frequency is fixed. These design limitations make the system inapplicable to the tracking of aircraft at certain speeds. At these speeds, the radial motion of the aircraft (its motion toward the antenna), during each pulse repetition interval, is equal or close to one-half wave length of the pulse carrier frequency. The resulting aircraft echoes have the same amplitude, pulse-to-pulse, and are therefore cancelled, just as if they were from fixed targets. These speeds are known as "blind speeds."

Another type of MTI radar system is known as an "area" MTI system. Here, the echoes received during one antenna scan interval are stored and compared with those received during the next antenna scan interval and, when they are different, an output signal is obtained. Any moving target occurs during one scan interval at a slightly different place in the scanning cycle than during the next scan interval and can be detected. Unlike line-by-line systems, the direction of target movement is not important. Furthermore, in area MTI no blind speeds exist. Finally, area MTI systems are non-coherent. A signal of reference phase is not required. This is advantageous as it decreases the equipment complexity.

An area MTI system has one serious disadvantage which has, up to the present time, been the limiting factor in its performance. This is the effect of the changes in amplitude of signals received from fixed targets ("clutter fluctuation"), as discussed, in brief, in volume 1 of the Radiation Laboratory Series, beginning at page 642. The return signal from a tree, for example, may change with changes in wind velocity or direction as these cause the leaves to present a different reflecting surface to the radar pulse. Changes in the clutter signal from scan-to-scan are detected by the area MTI system and appear as indications on the radar screen. When the indication from a moving target moves into the clutter indication, it is often impossible and at best very difficult to detect.

An object of the present invention is to provide improved means for reducing to a great extent the clutter signal variation from scan-to-scan and thereby reducing to a similar extent the intensity of the clutter indication on the radar screen.

Another object of the present invention is to provide an improved circuit for suppressing clutter signals.

As mentioned above, in area MTI, echoes are received and stored during one antenna scan interval and then compared with echoes received from the same objects during the following antenna scan interval. According to the present invention, the stored echoes are changed in amplitude immediately prior to the time they are to be compared with echoes received during the following antenna scan interval. This is done by deriving information immediately prior to the time of comparison as to the expected strength of the new signal. This information is received in the form of return signals from the target of interest. These return signals have amplitudes which are anticipatory of the strength of the return signals which will be received at the time of comparison of signals. The direction and extent of the change in the stored echoes are such as partially to reduce the differences in amplitudes between compared fixed target echoes (clutter fluctuation), and thereby correspondingly to reduce the residual clutter signal intensity on the radar screen. This process may be termed "up-dating." Up-dating has little effect on the echoes from moving targets as they change their position from scan-to-scan and cannot cancel when compared.

A preferred form of this invention is one which employs a storage tube. The radar information is "written" by the tube electron beam onto a surface of a dielectric plate upon which the beam impinges. The plate stores this information in the form of a charge pattern. Changes in the amplitude of the radar information from scan-to-scan are "read-out" and displayed on the radar visual indicator as moving target indications. According to this invention, the storage tube writing beam overlaps several lines of the stored charge pattern (image). Preferably, this is done by deflecting the highly focused electron beam along the angle coordinate of the storage plate at a speed lower than that required to make the target pulses charge separate lines of the storage plate area. Use is made of beam overlap in the following way. The radar information is simultaneously written and read out during each pulse-echo repetition interval. However, the information read out is applied to the radar visual indicator only on every second, third or higher numbered repetition interval. Assume, for example, that the information is supplied to the indicator only during every third repetition interval. During the first and second intervals, the writing beam overlaps the portion of the dielectric writing surface corresponding to the third repetition interval. The charge pattern previously stored on this portion of the dielectric surface is thereby brought partially up to date ("up-dated"). This is due to the fact that the clutter fluctuation from scan-to-scan (a relatively long interval of time) is substantially greater, on a statistical basis, than that occurring from repetition period to repetition period (a relatively short interval of time). During the third repetition interval, the difference in amplitude between the clutter signal written and the one stored during the corresponding portion of the previous scan is substantially reduced from the value it would have been if the stored charge pattern were not up-dated.

One might think it would be advantageous to bring the stored information fully rather than partially up to date. This could be done, for example, by providing 100% overlap of the storage tube beam during each reading-writing interval rather than providing for partial overlap. However, doing this would make the MTI radar system act like a line-by-line system, with the blind speed limitations already discussed. Moreover, if the stored pattern were completely up-dated, moving targets in the clear would be discriminated against. These move a much shorter distance from line-to-line than from scan-to-scan, and this reduces the detection probability, accordingly. It must be remembered, in this connection, that the area MTI system is not a coherent system and is not equipped to detect line-by-line.

The partial up-dating procedure described above has been found substantially to reduce the clutter fluctuation from scan-to-scan and thereby considerably to improve the performance of the area MTI system. In addition, according to the present invention, any remaining amount of clutter may be substantially suppressed. This is accomplished in the following way. The gain of the radar receiver is reduced during the time the storage tube output signal is applied to the radar indicator, thereby reducing the amplitude of the signal driving the storage tube. The effect is to produce a storage tube output signal of the same polarity for each "piece of clutter" and of an amplitude proportional to the clutter amplitude. Since clutter fluctuation is, to an approximation at least, proportional to clutter amplitude, this output signal is also proportional to clutter fluctuation. The output signal is applied either directly or after clipping to the radar indicator to bias the indicator to a value equal to or lower than its threshold of visibility. A signal from a moving target in the clutter is bipolar because of the Doppler beat between the target signal and the clutter signal. When the moving target is within the clutter, it adds to the clutter in the correct sense to tend to overcome the bias derived from the clutter 50% of the time. Whenever the MTI signal in the clutter is of an amplitude greater than that of the bias derived from the clutter and in the correct sense to overcome this bias, it appears on the visual indicator.

The invention will be described in greater detail by reference to the following description taken in connection with the accompanying drawing in which:

FIGURES 2a and 2b are sketches of the output wave of a prior art circuit and the circuit of FIGURE 1, respectively;

FIGURES 3b and 3c are circuit diagrams of a portion of the circuit of FIGURE 3a;

Figure 1:
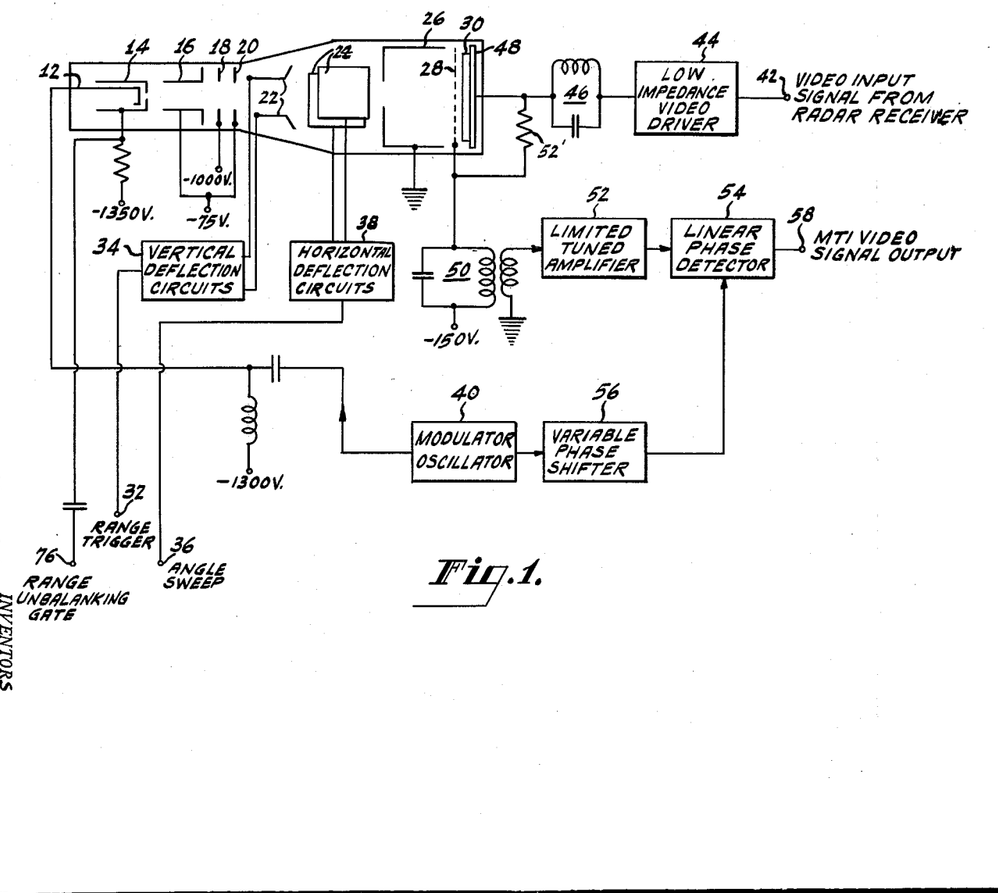
FIGURE 1 is a circuit diagram, partially in schematic and partially in block form, of a storage tube circuit suitable for use in the present invention.

In order to explain how the radar system of the present invention operates, it is necessary first to describe the storage tube and its associated circuits. These are shown in FIGURE 1. The storage tube 10 is a barrier grid storage tube. Its operation is described in the June, 1955 issue of the RCA Review in articles beginning at pages 197 and 234. The voltages shown for the various tube electrodes are those which were used in a practical circuit and are not meant to be limiting. The tube includes a cathode 12, a control grid 14 and three other grids 16, 18 and 20. It also includes a set of vertical deflection plates 22, horizontal deflection plates 24 and a collector 26. The focused electron beam passes through the deflection plates and collector and barrier grid 28 and onto the surface of dielectric member 30. The movement of the beam along the surface of the dielectric plate creates a charge pattern on the surface.

The radar system range trigger is applied to terminal 32 and actuates the vertical deflection circuits 34. These apply a saw-tooth wave to the vertical deflection plates 22 in order to sweep the focused electron beam along the range coordinate of the dielectric plate 30. A second saw-tooth wave derived from the scanning motion of the antenna is applied to terminal 36 and thence through the horizontal deflection circuits 38 to the horizontal deflection plates 34. In this case, the deflection circuit may comprise amplifier and impedance matching stages. This voltage acts to deflect the electron beam along the angle coordinate of the dielectric plate 30. The resultant display, when the angle coordinate is azimuth, is a type B display.

Modulator-oscillator 40 generates a radio frequency signal and applies the same to cathode 12 of the storage tube in order to intensity modulate the electron beam at a radio frequency rate. Although the frequency of stage 40 is not critical, 30 megacycles (a common intermediate frequency), is used in a preferred practical circuit. The video signal derived from echoes is applied to terminal 42 and thence through a low-impedance video driver circuit 44 and tuned circuit 46 to the back plate 48 of the storage tube. Tuned circuit 46 presents a low impedance to video frequencies and a high impedance to the 30 megacycle modulation frequency. Tuned circuit 50 also presents a low impedance to the video signal and a high impedance to the 30 megacycle modulating frequency. It can therefore be seen that the video input signal develops a voltage across resistor 52, that is, across the plate and barrier grid of the storage tube.

In operation, after several complete scanning cycles, the dielectric plate 30 becomes charged to an equilibrium potential. If the electron beam and applied video signal are then removed from a region of charge, the charge accumulated on the dielectric surface remains. When the electron beam and the video signal are returned to the same area, they again attempt to charge or discharge that area. If the video signal is of the same amplitude as the one of the previous cycle, then there is no net change in the charge and no output signal is developed. On the other hand, if the new video information is different from the one of the previous cycle, an output signal is developed having a sense and amplitude which are functions of the extent and direction of the change in the video signal amplitude. This process is the "writing" and "reading" action of the storage tube. In effect, when the video signals vary in amplitude from scan-to-scan, the tube produces an output signal, and when they do not, it produces no output signal.

Figure 2A:
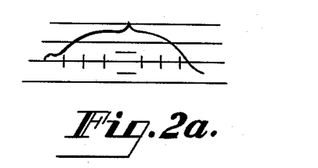

By reason of the modulation of the electron beam, the storage tube output signal, when one is present, consists of a modulated carrier which develops a voltage across tuned circuit 50. This carrier signal is not of constant phase nor amplitude but varies as a function of the position of the electron beam as the beam scans. Amplitude detection of this signal would yield, at equilibrium, a curved base line during the radar range sweep as shown in FIGURE 2a. For area MTI system applications, it not desirable to have a curved base line. High pass video filters could be employed to eliminate this effect but only at the price of a certain degree of loss in target resolution in the presence of clutter.

Figure 2B:
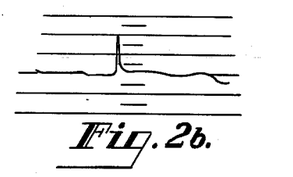

The circuit shown in FIGURE 1 gives an output signal such as shown in FIGURE 2b, that is, one with substantially no curve in the base line. The amplitude and phase modulated signal is passed through a limiting tuned amplifier 52 in order to remove amplitude variations from the signal. The resultant variable-phase, constant-amplitude output signal is applied to one of the input circuits of a linear phase detector 54. The second input signal to the phase detector is the modulator-oscillator signal which is applied to the detector through variable phase-shifter 56. Proper adjustment of phase-shifter 56 results in the substantial elimination of the curved base line from the output signal, and the signal shown in FIGURE 2b is available at terminal 58.

In the circuit of FIGURE 1, the electron beam of the storage tube is highly focused. However, the horizontal beam scanning speed is adjusted to make the beam overlap successive, discrete storage areas of the dielectric plate 30. In one respect this is a disadvantage as it lessens the sharpness of the stored image. However, as will be explained below, the beam overlap is made use of in a rather ingenious way in the present invention.

Figure 3A:
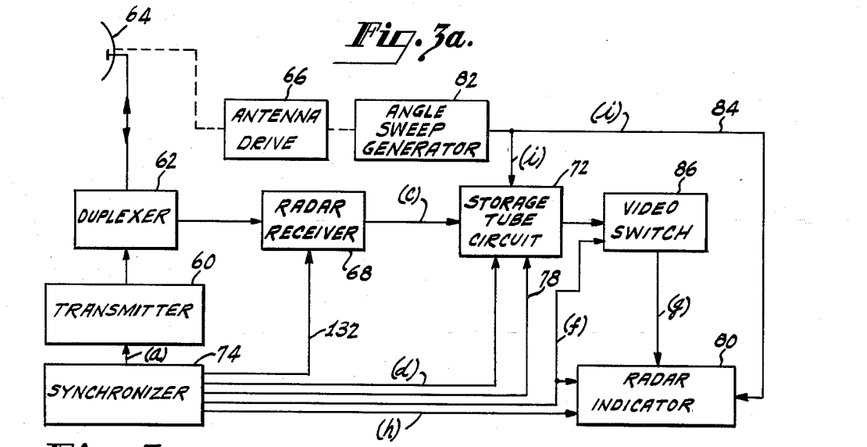
FIGURE 3a is a block circuit diagram of an MTI system according to the present invention.

The radar system of the present invention is shown in block diagram form in FIGURE 3a. Transmitter 60 applies short pulses of radio-frequency energy through duplexer 62 to scanable antenna 64. The duplexer may be a gas-filled tube and associated structure commonly termed a transmit-receive device. The antenna may be a parabolic cylinder or similar means for radiating and receiving a highly directive beam of radio-frequency energy. The antenna is driven back and forth through an angle of restricted size by antenna drive 66 which may comprise a motor, gears and the like. Alternatively, the beam may be swept by electronic means or by any other well known scanning technique.

Some of the transmitted pulses striking reflecting objects are returned to antenna 64 and applied from the antenna through duplexer 62 to radar receiver 68. The video signal output of the receiver is applied over line 70 and through the circuits shown in FIGURE 1 to the back plate 48 of the storage tube. The entire circuit of FIGURE 1 is illustrated in FIGURE 3 as a single block 72.

Figure 6:
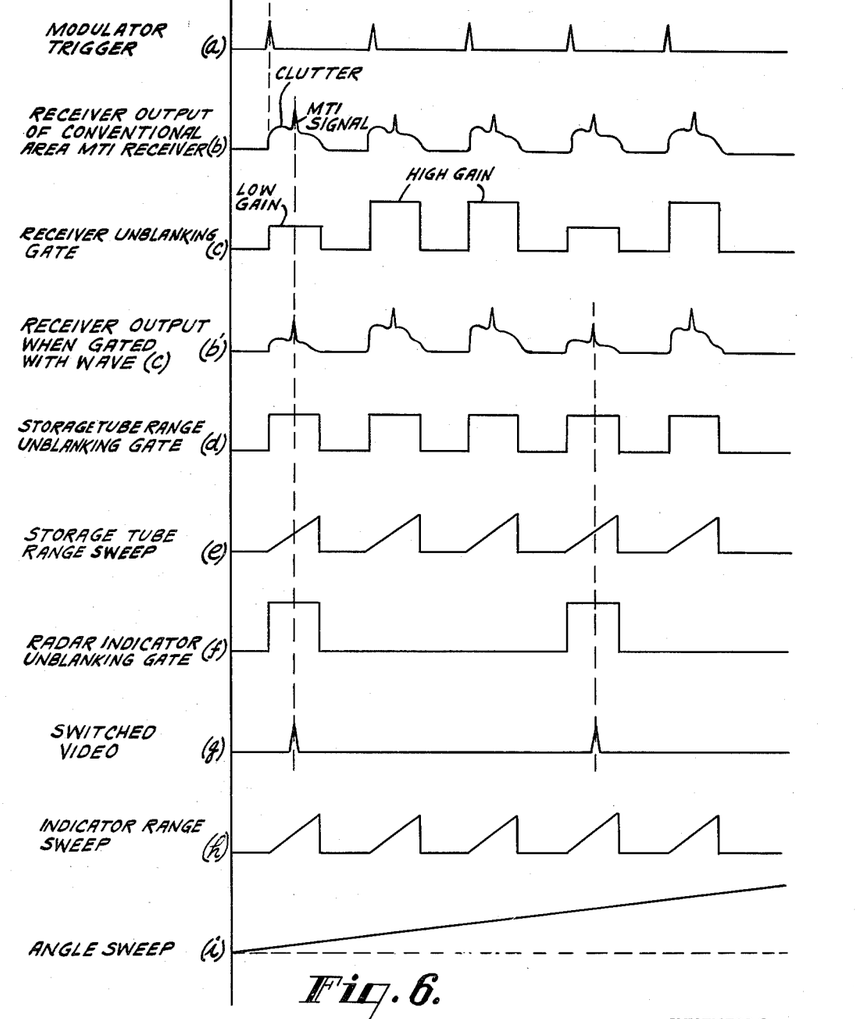

The central time base circuits for the radar system are indicated by a single block 74 labelled synchronizer. Circuits in this block produce modulator trigger pulses $a$ which are applied to trigger the transmitter 60. This waveform and others to be discussed below are shown in FIGURE 6. The circuits of block 74 also produce, synchronously with the modulator trigger pulses $a$, a storage tube range unblanking gate $d$ which is applied to the control grid of the storage tube. (The signal is applied to terminal 76 shown in FIGURE 1.) The function of the gate is to maintain the storage tube cut off except during the range sweeps. The third signal produced by the range synchronizer is the range sweep trigger which is applied to terminal 32 (FIGURE 1) over line 78. The fourth signal output of the range synchronizer is a radar unblanking gate $f$ which occurs synchronously with every third transmitted pulse. The function of this signal will be explained in greater detail later. Finally, the range synchronizer produces a range sweep voltage $h$ which is applied to the deflection means of the radar indicator 80.

Returning to the upper portion of FIGURE 3a, angle sweep generator 82 is driven by antenna drive 66 and produces a sweep voltage $i$ which is applied through circuits 38 (FIGURE 1) to the horizontal deflection means of the storage tube. The horizontal deflection circuits 38 may consist of amplifying and impedance matching stages. The angle sweep voltage is also applied over lead 84 to the horizontal deflection means of radar indicator 80. The latter may consist of a conventional electrostatic or electromagnetic type of cathode ray tube indicator. The video signal output of the storage tube circuit 72 is applied through a video switch 86 to indicator 80. It may be applied either to the control grid or cathode of the indicator in order to intensity modulate the cathode ray beam of the indicator. Video switch 86 is rendered conductive by pulses $f$ only during every third radar repetition period.

Figure 4:
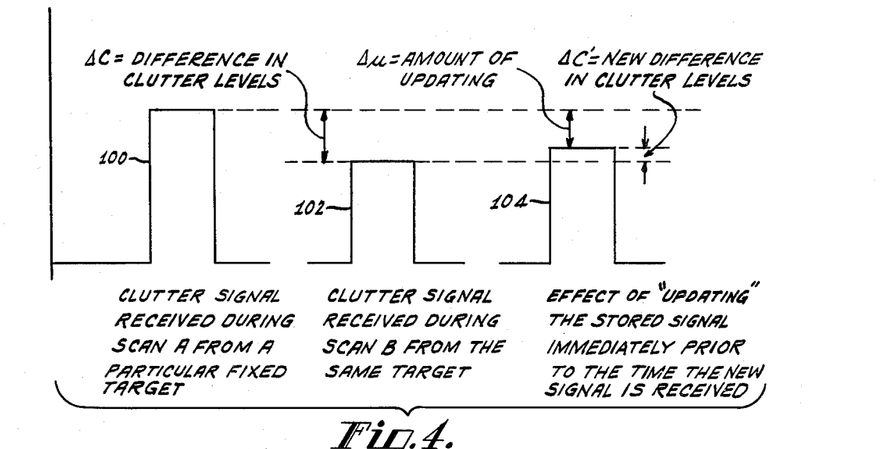
FIGURES 4, 5 and 6 are sketches of waveforms present at various places in the circuit of FIGURE 3.

FIGURE 4 illustrates one aspect of this invention. Assume that the signal 100 is a ground return signal received during scan A from a particular target. Assume also that during the period immediately after signal 100 is received, and before the next signal from the particular target is received, there are changes in the environmental conditions. The changes are such that the signal 102 received from the target during the next scan interval is of considerably lower amplitude. The difference in signal levels ΔC, in such cases, is sufficient to cause a change in the charge pattern on dielectric plate 30 of the storage tube and thereby to produce a factitious MTI video signal at terminal 58 (FIGURE 1). (The term "factitious" is used as the signal is not the result of a moving target but of a fixed one instead.) This is highly undesirable as it produces clutter on the radar indicator screen.

This invention proposes using only a portion of the received radar information. The remainder of the information, however, rather than being completely discarded, is utilized to bring up to date the information stored during the preceding scan. In a practical system, in which this invention may be incorporated, the transmitted pulse frequency employed is 5,500 pulses per second. The storage tube is driven at this high rate. However, the storage tube output signal is applied to the radar indicator at a rate of only 1,833 pulses per second—one-third of that of the 5,500 cycle rate. In effect, only one-third of the output signal information from the storage tube is employed.

Returning to FIGURE 4, signal 100 is the clutter signal return from a particular fixed target during one pulse repetition period of one scan interval. If this signal were stored and nothing more done, there would be a large difference in amplitude ΔC between it and the signal 102 received from the same target during the corresponding pulse repetition period of the next scan interval. According to this invention, during the two pulse repetition periods immediately prior to the time ΔC would be applied to the radar indicator, the storage tube is driven by a driving signal of usual amplitude. Due to the fact that the electron beam overlaps successive, discrete portions of the charged dielectric plate, the amplitude of stored signal 100 is changed in a direction such that it is brought closer to that of 102. This effect is possible as the change in the signal return from a fixed target is much smaller during the relatively short interval of time between pulse repetition periods than the relatively long interval of time between scans. The resultant "up-dated" signal is shown at 104. Note that the new difference in clutter levels ΔC' is much smaller than ΔC. Therefore, the change in the charge pattern during the interval in which the signal is applied to the radar indicator is much smaller, and the clutter signal appearing on the radar indicator is of much lower intensity.

Figure 7:
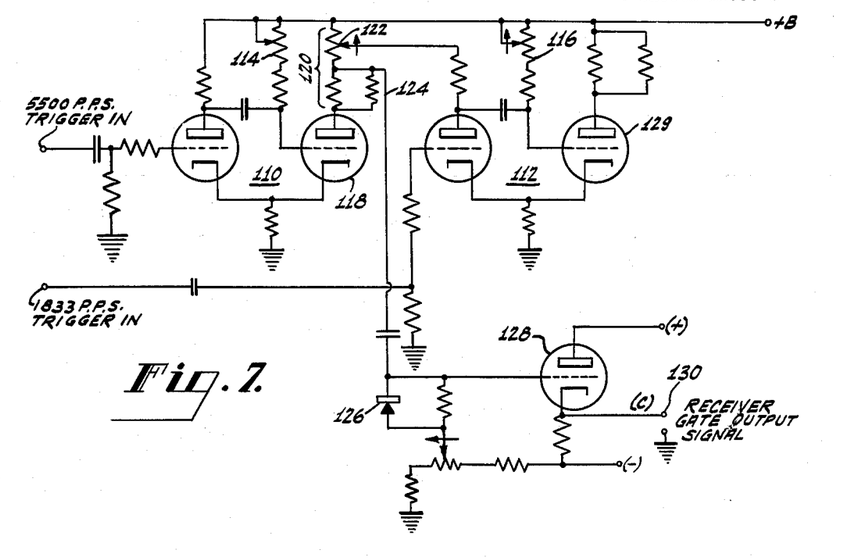
FIGURE 7 is a schematic circuit diagram of a portion of the system shown in block form in FIGURE 3.

The remaining portion of the clutter may be eliminated in the manner illustrated in FIGURES 5, 6, 7 and 9. During the interval the output information of the storage tube is applied through video switch 86 to the radar indicator 80, that is, during every third repetition interval, the receiver gain is reduced substantially under that of the receiver gain during the two repetition periods in which information is not applied to the radar indicator. The receiver unblanking gate may be as shown in FIGURE 6c. The circuit for obtaining a waveform of this type is shown in FIGURE 7 and will be explained in detail below. The resultant receiver gain characteristic may be as shown in somewhat idealized form in FIGURES 9a and 9b. In each figure the periods of high gain are indicated by solid line 200 and the periods of reduced gain by dashed line 202. With the gain characteristic as shown in FIGURE 9a, signals of all amplitudes are amplified with reduced gain during the reduced gain periods, whereas, with the characteristic of FIGURE 9b, only signals having greater than a given amplitude are amplified at reduced gain during the reduced gain periods. The advantage of the characteristic of FIGURE 9b is that weak signals received from targets in the clear are not discriminated against. It is possible easily to obtain either type of gain characteristic by proper receiver design. For example, the receiver characteristic of FIGURE 9a may be obtained by automatically changing the gain control voltage of a standard radar receiver. The characteristic of FIGURE 9b can be obtained by using a receiver which may be electronically switched from linear operation (curve 200) to linear-logarithmic operation (curve 202). Linear-logarithmic receivers are discussed in volume 23 of the Radiation Laboratory Series, beginning at page 583.

When the receiver gain is reduced, the driving signal applied to the storage tube is also reduced. Therefore, the signal written is of smaller amplitude than the one written during the previous scan in the corresponding portion of the scan cycle. This results in a storage tube clutter output signal, and this output signal is in a given direction.

Figure 5:
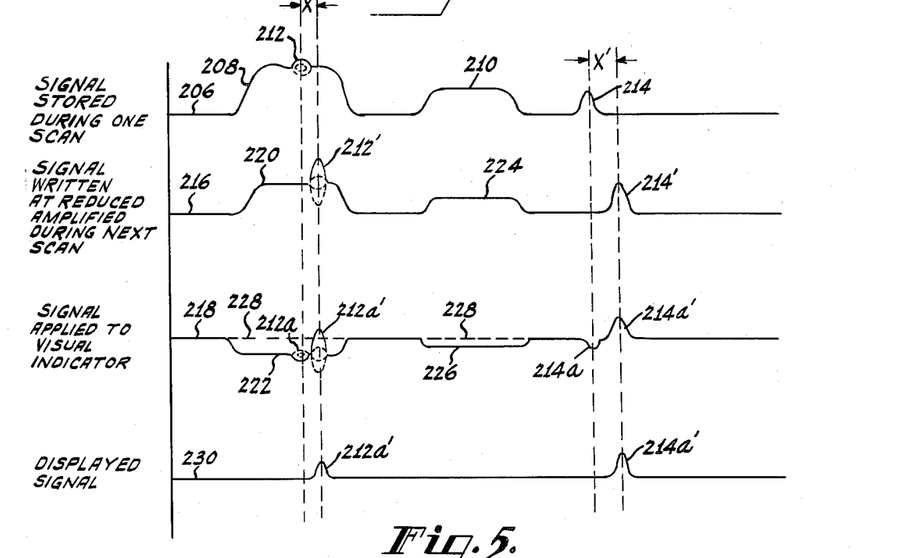

Referring to FIGURE 5, wave 206 represents the information stored on the dielectric plate of a storage tube during one repetition period of a given scan interval. Clutter from fixed target A appears at 208 and from fixed target B at 210. An MTI signal in clutter appears at 212 and one in the clear appears at 214. During the corresponding repetition period of the next scan, the information is written at reduced amplitude, as shown by wave 216. The moving targets corresponding to signals 212 and 214 have moved distances $x$ and $x'$, respectively.

Return signals from moving targets in clutter appear as bipolar signals due to the Doppler beat between the moving target and clutter signals. This is shown in FIGURE 5 at 212 and 212'. Return signals from moving targets in the clear are unipolar, as indicated in FIGURE 5 at 214 and 214'.

The storage tube and its associated circuits compare wave 206 with wave 216 and produce a resultant wave 218. Clutter signal 220 is smaller in amplitude than the corresponding signal 208 which was previously stored, and a resultant signal appears at 222. In the same manner, clutter signal 224 is lower in amplitude than clutter signal 210, whereby a resultant signal is produced at 226. Due to the movement of the moving targets, signals 212' and 214' appear at different places during the scans corresponding to waves 206 and 218. Therefore, the storage tube output wave 218 includes four output signals 212a, 212a', 214a and 214a' for only two moving targets. As will be explained below, stored signals from moving targets in the clear, such as signal 214a, are of an amplitude such that they cancel. Stored signals from moving targets in the clutter like 212a are bipolar but of relatively low amplitude and have no significant effect on the display.

Figure 3B:
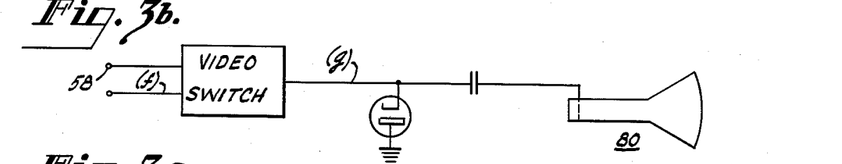
Figure 3C:
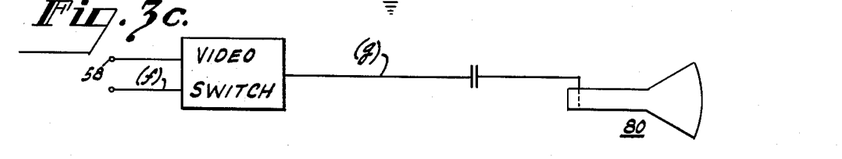

Wave 218 is applied either directly, as shown in FIGURE 3c, or after clipping, as shown in FIGURE 3b, to the control grid or, after inverting, to the cathode of radar indicator 80. The threshold of visibility of the radar indicator is as indicated by dashed line 228. The output signals 222 and 226 of the storage tube, which are derived from clutter, are applied to the indicator in the correct polarity to drive the indicator below its threshold of visibility, and these signals are therefore not indicated. These signals can be thought of as dynamic bias signals. The moving target signal 214a', which is in the clear, is indicated at a slightly lower amplitude than it would have been if the receiver gain were not reduced. However, as will be seen in FIGURE 8b, this reduction in amplitude is so small that it has no serious deleterious effect on the radar visual presentation. MTI signal 212a, which is in the clutter, is bipolar, as already indicated. Therefore, as can be seen in wave 218, one-half the time it adds to the dynamic bias signal 222, and the remainder of the time it subtracts from the dynamic bias signal. When this MTI signal is at a polarity such that it subtracts from the bias signal and is of sufficient amplitude to overcome the threshold of visibility of the radar indicator, it appears on the indicator screen as an intense mark. This is shown schematically by wave 230.

With the system of the present invention, an MTI signal in clutter can be seen, although it may be seen at somewhat under its normal amplitude. MTI signals in the clear are not substantially effected by the dynamic bias circuit. However, due to the reduced receiver gain, they may be displayed at slightly less than their normal amplitude.

One apparent problem is that a signal written at reduced amplitude during one scan may be compared with one written at reduced amplitude during the next scan. If this could occur, either no dynamic bias signal would be developed or, if one were developed, it might be developed in a sense opposite that which is required. However, the above type of operation is not possible. It must be remembered that the writing beam overlaps successive lines of the stored information. Therefore, even if the storage tube is driven with a signal of reduced amplitude during one repetition interval, the stored image is immediately up-dated during the immediately following repetition intervals.

The circuit of FIGURE 7 shows one means for obtaining the receiver unblanking gate shown in FIGURE 6c. The 5,500 pulse per second triggers are applied to singly-stable multivibrator 110. The 1,833 pulse per second triggers are applied to a similar singly-stable multivibrator 112. Both multivibrators produce output pulses having a duration equal to the radar range of interest. However, those produced by multivibrators 110 are at a 5,500 cycle repetition rate, similarly to the pulses shown in FIGURE 6d, and those produced by multivibrator 112 are at a 1,833 cycle repetition rate, similarly to the pulses shown in FIGURE 6f. The pulse widths may be adjusted by controls 114 and 116, respectively. The pulses are mixed in the plate circuit 120 of triode 118 of multivibrator 110. The pulses from multivibrator 112 are applied to circuit 120 in a polarity opposite to that of the pulses to multivibrator 110. The relative amplitudes of the mixed pulses may be adjusted by means of control 122. The mixed pulses are applied via lead 124 to clamper 126 and thence to output cathode follower 128. The receiver gate signal as shown in FIGURE 6c is available at terminal 130.

Returning for a moment to FIGURE 3a, the signal of FIGURE 6c is applied via lead 132 to the intermediate frequency stages of the radar receiver. The pulses $f$ for unblanking the video switch tube 86 may be derived from the plate circuit of tube 129 of multivibrator 112. These pulses may be applied to the screen grid of a tetrode which may comprise video switch 86. The video signal, on the other hand, may be applied from storage tube circuits 72 to the control grid of the tetrode. The tetrode is normally cut-off and pulses $f$ place the tube in condition to conduct in response to signals from circuits 72.

Figure 8A:
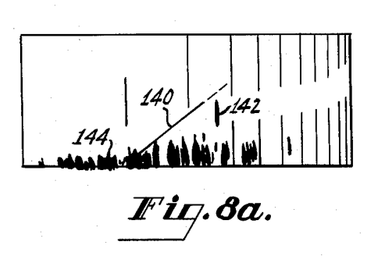
FIGURES 8a and 8b are tracings of photographs of a display of an area MTI system without and with the circuit of the present invention, respectively.
Figure 8B:
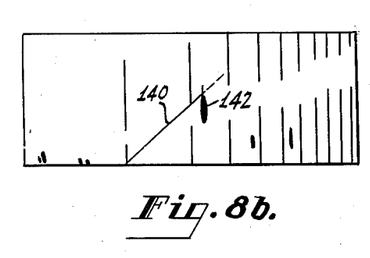
Figure 9A:
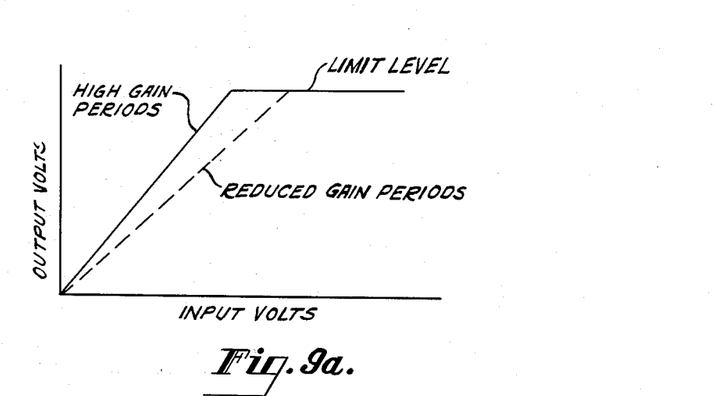
FIGURES 9a and 9b are sketches of characteristic curves, in accordance with the invention, of a receiver driven by a signal such as shown in FIGURE 6c.
Figure 9B:
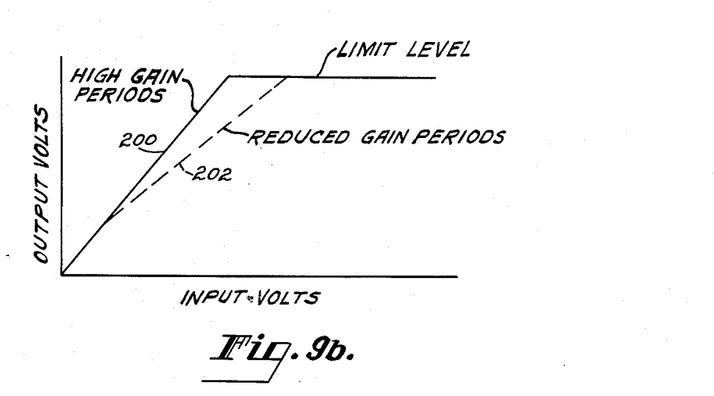

FIGURES 8a and 8b are tracings of actual photographs of the final approach elevation indicator of a GCA system. FIGURE 8a is one of an indicator with conventional area MTI circuits. The vertical lines are one mile electronic range marks. Line 140 is an electronic mark to indicate the correct guide path. Mark 142 is an aircraft on final approach at a distance of about 2.7 miles and approaching the glide path. The black marks 144 at the bottom of the screen are clutter signals.

FIGURE 8b is a tracing of the photograph of the display of FIGURE 8a with circuits of this invention connected. The photograph was made a very short interval of time after the one of FIGURE 8a. The aircraft represented by mark 142 is now at a distance of about 2.3 miles and still approaching the glide path. The clutter 144 is substantially completely eliminated.

What is claimed is:

1. In a radar system of the type including a directive scanning antenna means for illuminating fixed and moving objects in a volume of space and receiving return signals from said objects, means for storing the return signals received during each antenna scan interval, means for comparing the return signals stored during each antenna scan interval with those received during the following antenna scan interval, and means responsive to a difference in phase or amplitude between a stored return signal and a corresponding signal received from the same object during the following antenna scan interval for producing an indication having an intensity which is proportional to said difference in amplitude or phase, whereby both moving and fixed objects which produce return signals of different amplitude or phase from scan-to-scan are indicated, in combination, means for deriving from the fixed objects, during a time interval immediately prior to the time of comparison of the signals, return signals anticipatory of the strength of the return signals which will be received at the time of comparison of signals; and means for applying the last-named return signals to the means for storing the fixed object return signals to reduce the differences in amplitudes between the stored, fixed object return signals and the fixed object return signals with which they are to be subsequently compared.

2. A radar system comprising, in combination, a directive scanning antenna means for radiating pulses of radio energy in the direction of fixed and moving objects in a volume of space and receiving return pulses from said objects; storage tube means including means producing an electron beam, and charge storing means on which the beam impinges; means connected to said storage tube means and synchronous with the movement of said antenna means for deflecting said electron beam along an angle coordinate of said charge storing means; means connected to said storage tube means and synchronous with said pulse transmissions for successively deflecting said beam along a range coordinate of said charge storing means; circuit means operatively associated with said storage tube means and receptive of said return pulses for applying said pulses to said storage tube means for storage on said charge storing means in the form of a charge pattern, and for comparing the pulses stored during each antenna scan interval with those received during the following antenna scan interval, for deriving, in response to a difference in phase or amplitude, between a stored pulse and a corresponding pulse received from the same object during the following antenna scan interval, an output signal which is proportional to said difference in amplitude or phase; means associated with said storage tube means for causing the electron beam to overlap several lines of the stored charge pattern during the sweep of said beam along said range coordinate of said charge storing means; indicator means for displaying the output signals produced by said storage tube means; and means coupled between said storage tube means and said indicator means for applying the output signal of said storage tube means to said indicator means solely during each $n$th pulse repetition interval, where $n$ is an integer greater than 1 and less than 5.

3. In a radar system of the type including a directive scanning antenna means for illuminating fixed and moving objects in a volume of space and receiving return signals from said objects, means for storing the return signals received during each antenna scan interval, means for comparing the return signals stored during each antenna scan interval with those received during the following antenna scan interval, and means responsive to a difference in phase or amplitude between a stored return signal and a corresponding signal received from the same object during the following antenna scan interval for producing an output signal having an intensity which is proportional to said difference in amplitude or phase, and indicator means, having a given threshold of visibility and receptive of said output signal for producing a display of said signal; means for changing the amplitude of the return signals, at the time they are compared with those stored during the previous scan cycle, an amount sufficient to produce an output signal of one sense only corresponding to each fixed object return signal; and means for applying said output signals to said indicator means in a sense to tend to drive said indicator means below its threshold of visibility.

4. In a radar system of the type including a directive scanning antenna means for illuminating fixed and moving objects in a volume of space and receiving return signals from said objects, means for storing the return signals received during each antenna scan interval, means for comparing the return signals stored during each antenna scan interval with those received during the following antenna scan interval, and means responsive to a difference in phase or amplitude between a stored return signal and a corresponding signal received from the same object during the following antenna scan interval for producing an output signal having an intensity which is proportional to said difference in amplitude or phase, and indicator means, having a given threshold of visibility and receptive of said output signal for producing a display of said signal; means for substantially reducing the amplitude of the return signals, at the time they are compared with those stored during the previous scan cycle, by an amount sufficient to produce an output signal of one sense only corresponding to each fixed object return signal, and of an amplitude proportional to the amplitude of the stored, fixed object return signal; and means for applying said output signals to said indicator means in a sense to tend to drive said indicator means below its threshold of visibility.

5. In a radar system of the type including a directive scanning antenna means for illuminating fixed and moving objects in a volume of space and receiving return signals from said objects, means for storing the return signals received during each antenna scan interval, means for comparing the return signals stored during each antenna scan interval with those received during the following antenna scan interval, and means responsive to a difference in phase or amplitude between a stored return signal and a corresponding signal received from the same object during the following antenna scan interval for producing an output signal having an intensity which is proportional to said difference in amplitude or phase, and indicator means receptive of said output signal for producing a display of said signal; means for substantially reducing the amplitude of the return signals, at the time they are compared with those stored during the previous scan cycle, by an amount sufficient to produce an output signal of one sense only corresponding to each fixed object return signal, and of an amplitude proportional to the amplitude of the stored, fixed object return signal; circuit means for eliminating said output signals of one sense only; and means for applying said output signals through said last-named circuit means to said indicator means for indicating signals from moving objects but not from fixed objects.

6. A radar system comprising, in combination, a directive antenna means for illuminating fixed and moving objects in a volume of space and receiving return signals from said objects; receiver means coupled to said antenna means for amplifying and detecting said return signals; means coupled to said receiver means and receptive of said amplified signals for storing the amplified return signals received during each antenna scan interval; means for comparing the return signals stored during each antenna scan interval with those received during the following antenna scan interval; means responsive to the difference in phase or amplitude between a stored return signal and a corresponding signal received from the same object during the following antenna scan interval for producing an output signal having an intensity which is proportional to said difference in amplitude or phase; indicator means having a given threshold of visibility, and receptive of said output signal for producing a display of said signal; means for substantially reducing the gain of said receiver means at the time the return signals are compared with those stored during the previous scan cycle by an amount sufficient to produce an output signal of one sense only corresponding to each fixed object return signal, and of an amplitude proportional to the amplitude of the stored fixed object return signal; and means for applying said output signals to said indicator means in a sense such that the output signals derived from fixed object return signals do not tend to drive said indicator means above its threshold of visibility.

7. A radar system comprising, in combination, a directive scanning antenna means for radiating pulses of radio energy in the direction of fixed and moving objects in a volume of space and receiving return pulses from said objects; receiver means, coupled to said antenna means for amplifying and detecting said return pulses; storage means connected to receive said detected return pulses for storing the return pulses; comparison means including said storage means for comparing the return pulses stored during each antenna scan interval with those received during the following antenna scan interval, and responsive to a difference in phase or amplitude between a stored return pulse and a corresponding pulse received from the same object during the following antenna scan interval, for producing an output signal having an amplitude which is proportional to said difference in amplitude or phase; means for reducing the gain of said receiver means during each $n$th pulse repetition interval, where $n$ is an integer between 2 and 5, inclusive, by an amount sufficient to cause said comparison means to derive an output signal of the same sense for each stored fixed target pulse; means for changing the amplitude of the stored pulse in the correct sense to reduce the differences in amplitudes between the stored, fixed object return pulses and the fixed object return pulses with which they are to be compared, during at least some of the pulse repetition intervals between said $n$th interval; a visual indicator capable of displaying said output signals and having a threshold of visibility; and means connected between said comparison means and said indicator means for applying said output signals to said comparison means, solely during each $n$th pulse repetition interval, in a polarity such that those derived from fixed targets tend to drive said indicator means below its threshold of visibility.

8. A radar system comprising, in combination, a directive scanning antenna means for radiating pulses of radio energy in the direction of fixed and moving objects in a volume of space and receiving return pulses from said objects; receiver means coupled to said antenna means for amplifying and detecting said return pulses; storage means connected to receive said detected return pulses for storing the return pulses; comparison means including said storage means for comparing the return pulses stored during each antenna scan interval with those received during the following antenna scan interval, and responsive to a difference in phase or amplitude between a stored return pulse and a corresponding pulse received from the same object during the following antenna scan interval, for producing an output signal having an amplitude which is proportional to said difference in amplitude or phase; means for reducing the gain of said receiver means during each $n$th pulse repetition interval, where $n$ is an integer between 2 and 5, inclusive, by an amount sufficient to cause said comparison means to derive an output signal of the same sense for each stored fixed target pulse; a visual indicator capable of displaying said output signals and having a threshold of visibility; and means connected between said comparison means and said indicator means for applying said output signals to said comparison means, solely during each $n$th pulse repetition interval, in a polarity such that those derived from fixed targets tend to drive said indicator means below its threshold of visibility.

9. A radar system comprising, in combination, cyclically scannable directive antenna means for radiating pulses of radio energy and receiving return pulses reflected from fixed and moving objects; receiver means coupled to said antenna means for amplifying and detecting said return pulses; storage means connected to receive said detected return pulses for storing the return pulses; comparison means, including said storage means, for comparing the return pulses stored during each antenna scan interval with those received during the following antenna scan interval, and responsive to a difference in phase or amplitude between a stored return pulse and a corresponding pulse received from the same object during the following antenna scan interval, for producing an output signal having an amplitude which is proportional to said difference in amplitude or phase; means for reducing the gain of said receiver means during each $n$th pulse repetition interval, where $n$ is an integer between 2 and 5, inclusive, by an amount sufficient to cause said comparison means to derive an output signal of the same sense for each stored fixed target pulse; a visual indicator capable of displaying said output signals and having a threshold of visibility capable of being overcome by said output signals when they are of a given polarity; and means connected between said comparison means and said indicator means for applying said output signals to said comparison means, solely during each $n$th pulse repetition interval, and in a sense such that those derived from fixed targets are in a polarity opposite said given polarity.

10. A radar system comprising, in combination, cyclically scannable directive antenna means for radiating pulses of radio energy and receiving return pulses reflected from fixed and moving objects; receiver means coupled to said antenna means for amplifying and detecting said return pulses, storage means connected to receive said detected return pulses for storing the return pulses; comparison means, including said storage means, for comparing the return pulses stored during each antenna scan interval with those received during the following antenna scan interval, and responsive to a difference in phase or amplitude between a stored return pulse and a corresponding pulse received from the same object during the following antenna scan interval, for producing an output signal having an amplitude which is proportional to said difference in amplitude or phase; means for reducing the gain of said receiver means during each $n$th pulse repetition interval, where $n$ is an integer between 2 and 5, inclusive, by an amount sufficient to cause said comparison means to derive an output signal of the same sense for each stored fixed target pulse; a visual indicator capable of displaying said output signals and having a threshold of visibility capable of being overcome by said output signals when they are of a given polarity; an asymmetrically conducting device coupled to said comparison means and to said indicator means for eliminating all comparison means output signals having a polarity which is the same as that of signals derived from fixed targets, and applying the remaining comparison means output signals to said indicator means, solely during each $n$th pulse repetition interval, and in said given polarity.

11. A radar system as set forth in claim 9, wherein said storage means comprises a barrier grid type of storage tube.

12. A radar system comprising, in combination, cyclically scannable directive antenna means for radiating pulses of radio energy in the direction of fixed and moving objects in a volume of space and receiving return pulses from said objects; receiver means coupled to said antenna means for amplifying and detecting said return pulses; storage means, including a barrier grid type of storage tube having an electron beam and a charge storing member across two coordinates of the surface of which the beam is successively deflected to produce a charge pattern, connected to reecive said detected return pulses for storing the return pulses; comparison means including said storage means for comparing the return pulses stored during each antenna scan interval with those received during the following antenna scan interval, and responsive to a difference in phase or amplitude between a stored return pulse and a corresponding pulse received from the same object during the following antenna scan interval, for producing an output signal having an amplitude which is proportional to said difference in amplitude or phase; means for reducing the gain of said receiver means during each $n$th pulse repetion interval, where $n$ is an integer between 2 and 5, inclusive, by an amount sufficient to cause said comparison means to derive an output signal of the same sense for each stored fixed target pulse; means for changing the amplitude of the stored pulse in the correct sense to reduce the differences in amplitudes between the stored, fixed object return pulses and the fixed object return pulses with which they are to be compared, during the pulse repetition intervals between each said $n$th interval, said means comprising means for sweeping said electron beam along one of said coordinates at a rate sufficiently slow to overlap several lines of the charge pattern stored on said charge storing member; a visual indicator capable of displaying said output signals and having a threshold of visibility; and means connected between said comparison means and said indicator means for applying said output signals to said comparison means, solely during each $n$th pulse repetition interval, in a sense such that those derived from fixed targets tend to drive said indicator means below its threshold of visibility.

13. In combination, an electrical storage tube including means for producing an electron beam, a charge storage member on which said beam can be made to impinge, and beam deflection means; means coupled to said beam deflection means for successively deflecting said beam across one coordinate of said member at a first rate; means coupled to said beam deflection means for successively deflecting said beam along another coordinate of said member at a second rate which is much lower than said first rate; driving means coupled to said charge storing means for cyclically applying video signals to the latter at said second rate and thereby establishing a charge pattern on said charge storing member, some of said signal being of a given polarity only and other of said signals being bipolar; circuit means coupled to said storage tube and responsive to changes in said applied video signals from cycle-to-cycle for providing storage tube output signals having a sense indicative of the direction of said change and an amplitude indicative of the extent of said change; means coupled to said driving means for reducing the amplitude of the applied video signals, during each $n$th deflection at said first rate of said electron beam, where $n$ is an integer greater than 1 and less than 6, to obtain storage tube output signals of a given sense only corresponding to the video signals of said given polarity; and indicator means receptive of said storage tube output signals, solely during each $n$th interval, for indicating only those signals having a sense opposite to said given sense.

14. In the combination as set forth in claim 13, said indicator means comprising a cathode ray tube indicator.

15. In the combination as set forth in claim 13, said indicator means including a diode connected to eliminate from said storage tube output signals all signals of said given sense, and a cathode ray tube indicator connected to receive the output of said diode for indicating those signals having a sense opposite to said given sense.

16. In combination, an electrical storage tube including means for producing an electron beam, a charge storage member on which said beam can be made to impinge, and beam deflection means; means coupled to said beam deflection means for successively deflecting said beam across one coordinate of said member at a first rate; means coupled to said beam deflection means for successively deflecting said beam along another coordinate of said member at a second rate which is much lower than said first rate, and which is sufficiently slow to cause the beam to overlap several lines along said first coordinate during each sweep of said beam at said first rate; driving means coupled to said charge storing means for cyclically applying video signals to the latter at said second rate and thereby establishing a charge pattern on said charge storing member, some of said signals being of a given polarity only and other of said signals being bipolar; circuit means coupled to said storage tube and responsive to changes in said applied video signals from cycle-to-cycle for providing storage tube output signals having a sense indicative of the direction of said change and an amplitude indicative of the extent of said change; means coupled to said driving means for reducing the amplitude of the applied video signals, during each $n$th deflection at said first rate of said electron beam, where $n$ is an integer greater than 1 and less than 6, to obtain storage tube output signals of a given sense only corresponding to the video signals of said given polarity; and indicator means receptive of said storage tube output signals, solely during each $n$th interval, for indicating only those signals having a sense opposite to said given sense.

17. In combination, an electrical storage tube including means for producing an electron beam, a charge storage member on which said beam can be made to impinge, and beam deflection means; means coupled to said beam deflection means for successively deflecting said beam across one coordinate of said screen at a first rate; means coupled to said beam deflection means for successively deflecting said beam along another coordinate of said screen at a second rate which is much lower than said first rate and sufficiently slow to cause said electron beam to overlap a restricted portion of said charge storage member on at least $n$ successive deflections at said first rate, where $n$ is an integer greater than 1 and less than 20; driving means coupled to said charge storing means for cyclically applying video signals to the latter at said second rate and thereby establishing a charge pattern on said charge storing means; circuit means coupled to said storage tube and responsive to changes in said applied video signals from cycle-to-cycle for providing storage tube output signals having a sense indicative of the direction of said change and an amplitude indicative of the extent of said change; and indicator means receptive of said storage tube output signals, solely during each $n$th interval, for indicating said output signals.

No references cited.

UNITED STATES PATENT OFFICE
CERTIFICATE OF CORRECTION

Patent No. 2,989,742                  June 20, 1961

Miles C. Johnson et al.

It is hereby certified that error appears in the above numbered patent requiring correction and that the said Letters Patent should read as corrected below.

Column 4, line 61, after "it" insert -- is --; column 10, line 51, before "antenna" insert -- scanning --.

Signed and sealed this 14th day of November 1961.

(SEAL)
Attest:

ERNEST W. SWIDER
Attesting Officer

DAVID L. LADD
Commissioner of Patents

USCOMM-DC